(12) United States Patent
Bennett et al.

(10) Patent No.: US 9,247,175 B2
(45) Date of Patent: Jan. 26, 2016

(54) PARALLEL TELEVISION REMOTE CONTROL

(75) Inventors: James D. Bennett, Jungmannova (CZ); Jeyhan Karaoguz, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 956 days.

(21) Appl. No.: 11/290,974

(22) Filed: Nov. 30, 2005

(65) Prior Publication Data
US 2007/0124765 A1    May 31, 2007

(51) Int. Cl.
| H04N 5/44 | (2011.01) |
| H04N 5/445 | (2011.01) |
| H04N 21/41 | (2011.01) |
| H04N 21/422 | (2011.01) |
| H04N 21/4363 | (2011.01) |
| H04N 21/61 | (2011.01) |

(52) U.S. Cl.
CPC ......... *H04N 5/4403* (2013.01); *H04N 5/44543* (2013.01); *H04N 5/44582* (2013.01); *H04N 21/4126* (2013.01); *H04N 21/42209* (2013.01); *H04N 21/42222* (2013.01); *H04N 21/4363* (2013.01); *H04N 21/6175* (2013.01); *H04N 2005/441* (2013.01); *H04N 2005/4428* (2013.01)

(58) Field of Classification Search
CPC .......... G08C 2201/92; G08C 2201/93; H04N 5/4403; H04N 21/42209
USPC .......................................... 340/15
See application file for complete search history.

(56) References Cited

U.S. PATENT DOCUMENTS

| 5,861,881 A * | 1/1999 | Freeman et al. .............. 715/201 |
| 6,097,441 A * | 8/2000 | Allport ......................... 348/552 |
| 6,263,503 B1* | 7/2001 | Margulis ........................ 725/81 |
| 6,363,204 B1* | 3/2002 | Johnson et al. ............... 386/230 |
| 6,407,779 B1* | 6/2002 | Herz ............................. 348/734 |

(Continued)

FOREIGN PATENT DOCUMENTS

| CN | 2705977 | 6/2005 |
| CN | 1647508 | 7/2005 |

(Continued)

OTHER PUBLICATIONS

European Search Report corresponding to European Patent Application No. 06016559.4-1241, dated Jan. 29, 2008, 3 pages.

*Primary Examiner* — Claire X Pappas
*Assistant Examiner* — Robert Stone
(74) *Attorney, Agent, or Firm* — Brinks Gilson & Lione

(57) ABSTRACT

A remote control with a built-in miniature television screen and sound system manages settings and display of media on an associated television screen. The remote control's user interface permits media guide perusal and channel selection for display on both of the main and miniature television screens. Media guides can be downloaded per request to, or cached within, the remote control for display on the miniature screen. The remote control supports media swapping between the main and miniature television screens and associated sound systems. The sound system of the remote control includes built in speakers and external wired and wireless headphone support. Media and media guides may be located and downloaded from Internet servers via a web browser and associated search engine tailored for remote control usage. Transcoding functionality is employed at various network nodes, such as a set top box, remote control, an intranet or Internet linked device, and television.

19 Claims, 10 Drawing Sheets

(56) References Cited

U.S. PATENT DOCUMENTS

| | | | |
|---|---|---|---|
| 6,496,122 B2* | 12/2002 | Sampsell | 340/4.42 |
| 6,553,345 B1* | 4/2003 | Kuhn et al. | 704/275 |
| 6,567,984 B1* | 5/2003 | Allport | 725/110 |
| 6,781,518 B1* | 8/2004 | Hayes et al. | 340/825.72 |
| 6,859,197 B2* | 2/2005 | Klein et al. | 345/158 |
| 2002/0019984 A1* | 2/2002 | Rakib | 725/111 |
| 2002/0044225 A1* | 4/2002 | Rakib | 348/734 |
| 2002/0057209 A1* | 5/2002 | Sampsell | 340/825.69 |
| 2002/0069218 A1* | 6/2002 | Sull et al. | 707/501.1 |
| 2002/0085023 A1* | 7/2002 | Zustak et al. | 345/733 |
| 2002/0094121 A1* | 7/2002 | Itani et al. | 382/162 |
| 2002/0138851 A1* | 9/2002 | Lord et al. | 725/133 |
| 2002/0162121 A1* | 10/2002 | Mitchell | 725/135 |
| 2003/0038849 A1* | 2/2003 | Craven et al. | 345/864 |
| 2003/0053638 A1* | 3/2003 | Yasuhara | 381/86 |
| 2003/0097662 A1* | 5/2003 | Russ et al. | 725/117 |
| 2004/0008287 A1* | 1/2004 | Johnston et al. | 348/734 |
| 2004/0066308 A1* | 4/2004 | Sampsell | 340/825.69 |
| 2004/0095316 A1* | 5/2004 | Shibamiya et al. | 345/156 |
| 2004/0117835 A1* | 6/2004 | Lorkovic | 725/81 |
| 2004/0187152 A1* | 9/2004 | Francis et al. | 725/58 |
| 2005/0097623 A1* | 5/2005 | Tecot | G11B 27/10 725/136 |
| 2005/0114901 A1* | 5/2005 | Yui | H04N 7/163 725/100 |
| 2005/0174489 A1* | 8/2005 | Yokoyama et al. | 348/553 |
| 2005/0251821 A1* | 11/2005 | Pina | 725/39 |
| 2006/0045462 A1* | 3/2006 | Poslinski | 386/46 |
| 2006/0184974 A1* | 8/2006 | Sakao et al. | 725/80 |
| 2006/0290823 A1* | 12/2006 | Kondo | H04N 5/4403 348/734 |
| 2006/0291507 A1* | 12/2006 | Sarosi et al. | 370/493 |
| 2006/0294559 A1* | 12/2006 | Ansari et al. | 725/100 |
| 2007/0057762 A1* | 3/2007 | Han et al. | 340/5.26 |
| 2007/0124792 A1* | 5/2007 | Bennett | H04M 1/0233 725/133 |
| 2007/0162938 A1* | 7/2007 | Bennett | H04N 21/4113 725/72 |
| 2008/0120668 A1* | 5/2008 | Yau | 725/110 |
| 2008/0163328 A1* | 7/2008 | Philbin et al. | 725/139 |
| 2008/0178224 A1* | 7/2008 | Laude et al. | 725/44 |

FOREIGN PATENT DOCUMENTS

| | | |
|---|---|---|
| EP | 1521453 | 4/2005 |
| WO | WO 99/34564 | 7/1999 |
| WO | WO 99/34599 | 7/1999 |

* cited by examiner

PARALLEL TELEVISION REMOTE CONTROL

CROSS-REFERENCE TO RELATED APPLICATIONS/INCORPORATION BY REFERENCE

The present application is related to U.S. patent application Ser. No. 11/290,297, filed Nov. 30, 2005, titled "CONTROL DEVICE WITH LANGUAGE SELECTIVITY," U.S. patent application Ser. No. 11/289,971, filed Nov. 30, 2005, titled "PHONE BASED TELEVISION REMOTE CONTROL," U.S. patent application Ser. No. 11/289,848, filed Nov. 30, 2005, titled "PARALLEL TELEVISION DOCKING ADAPTER," and U.S. patent application Ser. No. 11/290,079, filed Nov. 30, 2005, titled "UNIVERSAL PARALLEL TELEVISION REMOTE CONTROL," each of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

This invention generally relates to controlling selection and delivery of broadcast video signals; and, more particularly, to remote control interaction with televisions, set top boxes and other video sources.

A typical remote control (or "Remote" as used herein) has a series of predefined buttons that, when selected, directly interact with a corresponding TV ("Television") to perform a variety of tasks such as changing channels, adjusting TV settings, and controlling power to the TV. Such direct interaction typically comprises one-way infrared transmissions from the Remote to the TV but may also involve radio frequency transmissions.

A TV responds to transmissions received from a Remote by displaying on the TV's screen a selected channel, status or information, and/or a visual user interface for managing a control function. Upon receiving the visual user interface on the TV screen, the user may press further buttons on the Remote as needed to complete a task. Because of numerous buttons and non-standard button layout, Remotes are often difficult to use and often require users to look back and forth at the Remote and TV to complete a task.

Many types of video systems are used to provide supplemental or alternate video to the television. Many of these video systems directly source locally accessed video and others, alternatively or in addition, provide television broadcast tuners for managing television channel selection and video and audio settings. Exemplary video systems include cable, fiber and satellite Set Top Boxes (STBs), Personal Video Recorders (PVRs), and Digital Video Disk (DVD) players. Each of these video systems delivers video to a TV, and is controlled through direct interaction or via a Remote. To interact with a user, video systems deliver information via a TV's screen and speakers, and receive information directly from a Remote. Again, as previously mentioned, such interaction usually requires a user to look back and forth at the Remote and TV Screen in attempts to locate buttons and understand the Remote's operation.

With presently used Remotes, the user only finds out about channel content and button/interface effects upon selection and interaction via the TV screen. This causes disturbance to the other viewers, particularly when one viewer operates the Remote according to his and not the entire group of viewers' desires.

Also, typical interaction via a Remote, often results in undesirable channels being offered to an entire group of viewers. For example, when an adult scans through available channels by pressing an up or down button on the Remote (hereinafter "channel surfing"), channels with adult content might appear on the TV screen with an audience of young viewers present. Likewise, some viewers may be offended, shocked or otherwise dislike certain other types of content, and are often forced to view such content by the channel surfing process.

In a home TV entertainment environment, viewers typically dislike having the display of entertaining programs interrupted. A channel surfing viewer often becomes intolerable to other viewers that do not have control over the Remote. Likewise, during channel surfing, viewers that do not have control over the Remote cannot adequately participate in the channel surfing. Frustration arises when the surfing viewer goes too fast, too slow, or does not stop on one of the surfed channels. Similarly, the viewer with the Remote often finds their surfing constrained by the verbal commands from other viewers that attempt to control the process. These problems either drives away one or all of the viewers, causes viewer conflict, and/or limits channel surfing abilities.

Further limitations and disadvantages of conventional and traditional systems will become apparent to one of ordinary skill in the art through comparison of such systems with the present invention described herein.

BRIEF SUMMARY OF THE INVENTION

Various aspects of the present invention provide a remote control with a built-in miniature television screen and sound system manages settings and display of media on an associated television screen. These and other advantages, aspects and novel features of the present invention, as well as details of illustrative aspects thereof, will be more fully understood from the following description and drawings.

DETAILED DESCRIPTION OF THE INVENTION

Various aspects of the present invention are found in a remote control infrastructure that controls display of a first media program on a first screen of a television. The remote control infrastructure contains a remote control, a media source and at least one communication pathway. The remote control has a second screen and a user interface through which user input corresponding to the selection of the first media program is received. In response to such receipt, the remote control causes the second screen to display the first media program. The remote control also responds to further user input by delivering a first control signal that causes the first screen to also display the first media program.

The media source can be, for example, a set top box, server, media player or personal video recorder. In some configurations, the media source delivers video of the first media program for display on the first and second screens. Regardless of the actual source, first and second video may be tailored for the first and second screen, respectively.

The remote control may also contain audio circuitry that supports any or all of wired or wireless headsets and internal speakers. The remote control can access the first media program via a media guide displayed on the second screen. A remote control may also support a network browser through which, for example, a search interface may be used to identify the first media program.

Some of these and other aspects of the present invention may also be found in remote control circuitry used to control display of a program on both a television screen and a remote control screen. The remote control circuitry contains a communication interface, display driver, input interface and processing circuitry. It may also contain audio circuitry.

In particular, the processing circuitry responds to the receipt of a user selection via the input interface by delivering the program from the communication interface to the display driver. The display driver controls the remote control screen. The processing circuitry also delivers via the communication interface a control signal that requests display of the program on the television screen.

In some configurations, the processing circuitry also delivers a media guide to the display driver. In such configurations, the user selection may consist of a media guide selection.

Figure 1:
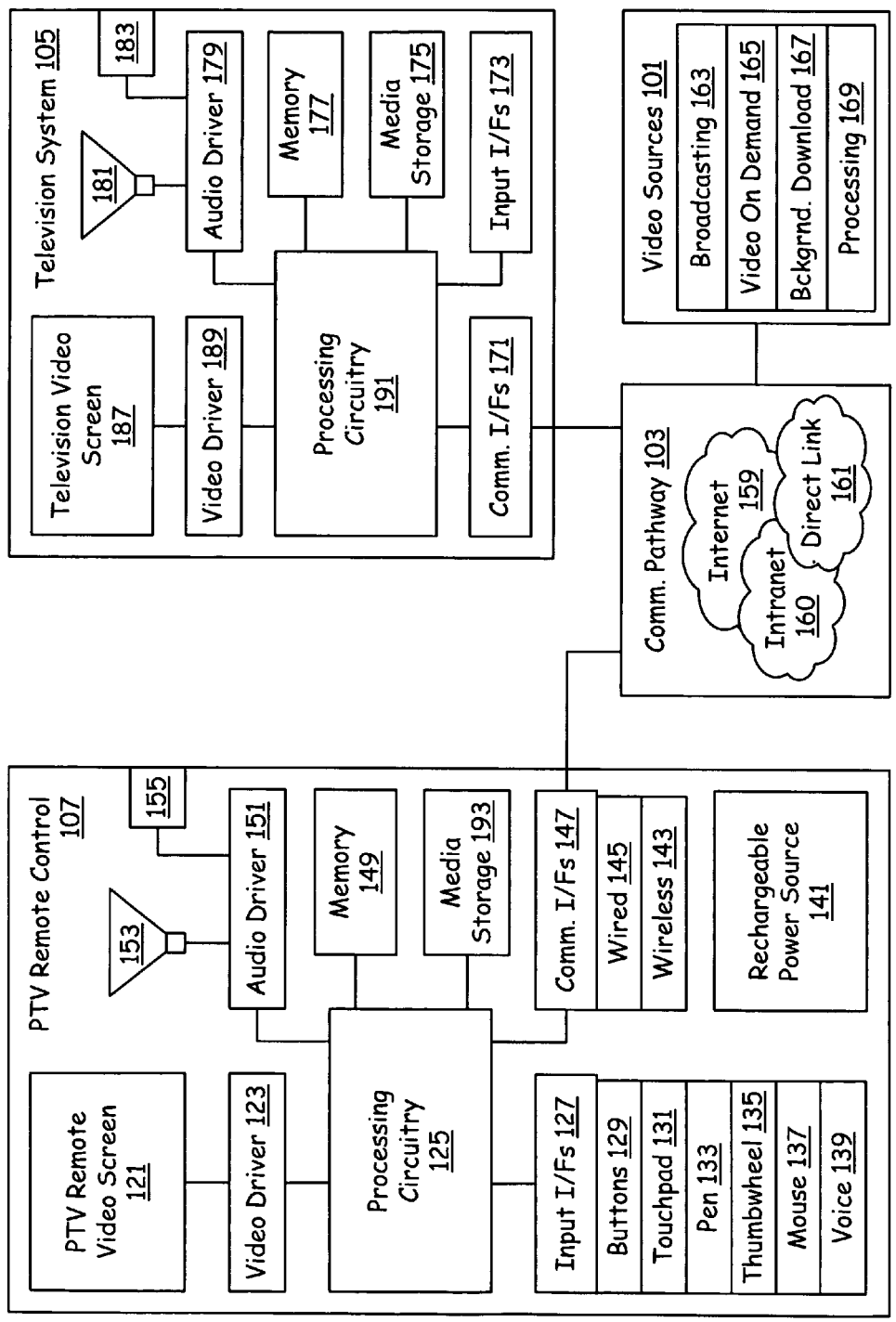
FIG. 1 is a schematic block diagram illustrating an exemplary architecture of an entertainment network built in accordance with various aspects of the present invention, wherein a remote control having a built-in video screen and sound system interacts with a television system and other local and remote video equipment.

FIG. 1 is a schematic block diagram illustrating an exemplary architecture of an entertainment network built in accordance with various aspects of the present invention, wherein a remote control having a built-in video screen and sound system interacts with a television system and other local and remote video equipment. It also portrays various local and remote video sources delivering video for display on both the remote control and television screens per viewer input received via the remote control. The remote control selects the delivered video for display on both or either of the remote control and television screens.

More specifically, video sources 101 deliver video to a TV (Television) system 105, which will also be referred to herein as "media system 105," and a PTV ("parallel TV") remote control 107 via a communication pathway 103. Such video delivery from the video sources 101 occurs both for, and in response to, a viewer's selection via the PTV remote control 107. For example, some types of video are only delivered after they have been selected by the PTV remote control 107 for delivery, while other types of video are delivered even though they have not been selected by the PTV remote control 107 but are only displayed upon selection.

In particular, the video sources 101 offer various types of video to be viewed by the PTV remote control 107 and the television system 105. The video sources 101 include TV broadcasting sources 163, video on demand sources 165 and background downloading sources 167. The TV broadcasting sources 163 include cable, fiber and satellite multiple-channel broadcast providers and single-channel broadcast stations. Such channel broadcasts are delivered via the communication pathway 103, and await selection of a channel by the PTV remote control 107 for display on a television video screen 187 and/or a PTV remote video screen 121. The video on demand sources 165 and the background downloading sources 167 also include such cable, fiber and satellite providers or various Internet based servers that provide unicast or multicast delivery of viewer-selected video. Unlike the video on demand sources 165, the background download sources 167 deliver video to the media system 105 for later "non-real time" playback.

Many of the plurality of video sources 101 are located at remote premises and service a plurality of TV media systems and associated PTV remote controls, such as those mentioned above. Other of the video sources 101 are located locally at the same premises as, and to service, the media system 105 and the PTV remote control 107. For example, in addition to remote sources, the video on demand sources 165 may include a Digital Video Disk (DVD), Video Home System (VHS), Personal Video Recorder (PVR) and other types of video storage players.

The video from the video sources 101 originate in a variety of formats, e.g., analog, digital, compressed, encoded, etc., and is processed before display by the television system 105 and the PTV remote control 107. Such processing may take place in one or all of processing circuitry 125, 191 and 169. The processing circuitry 125, 191 and 169 may be implemented utilizing various hardware and/or software modules.

With the PTV remote control 107 in hand in a local premises, a first viewer watches video from a first channel being displayed on the PTV remote video screen 121, while a second viewer watches a second channel, that had been previously viewed on and selected via the PTV remote control 107, on the television video screen 187. Using a swap command delivered via one of a plurality of input interfaces 127, the first viewer may then cause the television video screen 187 to display the first channel, while the PTV remote video screen 121 displays the second. The PTV remote control 107 may also be used to view a media guide or listing from which a particular program or channel may be selected for viewing on either or both of the screens 121 and 187.

The PTV remote control 107 and the television system 105 communicate via a communication interface 147 that supports both wireless 143 and wired 145 communication according to proprietary and industry standard protocols making up the communication pathway 103. For example, the communication pathway 103 may comprise one or any wireless and wired combination of Internet 159, intranet 160 and direct link 161.

Video signals are delivered to the processing circuitry 125 via a communication interface 147 of the PTV remote control 107. After processing to extract the incoming video and audio, the processing circuitry 125 delivers the video to the PTV remote video screen 121 via a video driver 123. The processing circuitry 125 also delivers the extracted audio to selected ones of a speaker 153, a wired headphone jack 155, and the communication interface 147 for delivery to a wireless headphone (not shown). A memory 149 supports the processing circuitry 125 in the audio and video extraction process. A media storage 193 both acts as a short-term buffer for video being displayed, and stores previously received video for longer periods of time and later playback.

A viewer interacts with the PTV remote control 107 and the television system 105 via the input interfaces 127 that include buttons 129, touchpad 131, pen 133, thumbwheel 135, mouse 137 and voice recognition components 139. Through interaction with the PTV remote control 107, the viewer a) accesses program and channel listings and directories of available video on demand and background download sources, i.e., accesses media guides; b) selects particular video from a media guide; c) causes the display of the selected video on either or both of the PTV remote video screen 121 and television video screen 187; d) invokes a screen swapping command; and e) performs screen and audio configuration and device setup for both the television system 105 and PTV remote control 107.

The internal components of the television system 105 are identical with that of the PTV remote control 107. The television system 105 includes a television and possibly a set top box and audio reproduction system, depending on the particular installation. More specifically, the processing circuitry 191 of the television system 105 receives video and audio signals via one or more of the communication interfaces 171. The processing circuitry 191 delivers received video to the television screen 187 via a video driver 189, while simultaneously delivering the received audio to one or more of a speaker 181, audio output jack 183 (that supports, for example, a wired headset or audio system, and the communication interface 171 (that supports a wireless headset or audio system). As an alternative to control by the PTV remote control 107, input interfaces 173 such as a keypad allow direct control of the television system 105.

The processing circuitry 191 also interacts with memory 177 and media storage 175. The processing circuitry 191 uses program code stored within the memory 177 to conduct video processing, and to carry out commands received from the PTV remote control 107. The media storage 175 is used for short and longer-term storage to respectively support buffering and later playback of received video.

For example, a viewer may enter a command via the buttons 129 to display a television channel listing, i.e., a media guide, corresponding to available video channel broadcasts from the TV broadcasting 163 of the video sources 101. Such media guide may have been delivered previously or upon request from the TV broadcasting 163 providers. The processing circuitry 125 receives the command from the buttons 129, and responds to the command by delivering the media guide to the PTV remote video screen 121 via the video driver 123. Using the touchpad 131, the viewer may then deliver a second command to the processing circuitry 125 to cause selection of one of the media guide listings, i.e., a channel, for display on the television screen 187. The processing circuitry 125 responds to the second command by delivering the second command to the processing circuitry 191 via the communication interfaces 147 and 171 and the communication pathway 103. Upon receipt of the second command, the processing circuitry 191 tunes to the selected channel, processes the channel video and audio, delivers the, processed video for display on the television screen 187, and delivers the processed audio, for example, to the speaker 181.

Thereafter, the viewer may enter a third command via the buttons 129 requesting a second media guide from another of the video sources 101, for example, an Internet based media server. The processing circuitry 125 responds by delivering the request to the media server of the video sources 101 via one of the communication interfaces 147 and the Internet 159. The media server responds by delivering the requested second media guide via the Internet 159 to the communication interfaces 147. The processing circuitry 125 receives then delivers the second media guide to the video driver 123 for display on the PTV remote video screen 121. The viewer responds to the display by entering a fourth command that directs the processing circuitry 125 to display video selected via the second media guide. The processing circuitry 125 responds by requesting the selected video from the media server of the video sources 101. As the selected video is received, the processing circuitry 125 delivers the video to the video driver 123 for display while delivering the audio component of the video to the audio driver 151 for playback.

Lastly, for example, the viewer can enter a swapping command via the input interfaces 127. In response, the processing circuitry 125 and 191 coordinate to cause the video being displayed on the PTV remote video screen 121 and television video screen 187 to be swapped. In particular for example, the processing circuitry 125 sends a request to the processing circuitry 191 for identifiers associated with the video source, video selection being displayed, and current offset into the current video selection, if appropriate, of the video being displayed by the television video screen 187. Upon receipt of the identifiers, the processing circuitry 125 sends all necessary of such types of identifiers associated with the video being displayed on the PTV remote video screen 121 to the processing circuitry 191. Having exchanged identifiers, the processing circuitry 125 and 191 use the exchanged identifiers to access and display the corresponding video and playback the associated audio, completing the swap.

The communication pathway 103 is a facility, which is similar to a mobile base station for wireless communication but operating according to a standard such as Bluetooth (BT). Its main function is to start and exchange video channel identifier and video device identifier through a communication link (BT channel), and transmit the selected video to the PTV remote control 107 on the established BT channel between it and the PTV remote 107.

Communication pathway 103 can communicate through the established link having corresponding uplink and the downlink frequencies to communicate between various video devices. When a command is executed by one of the viewers on his PTV remote control 107, it will be communicated to the communication pathway 103 on a fixed channel. The simultaneous execution of a command by different viewers using their PTV remote control, generating signals to interact with the communication pathway 103, can be resolved using a carrier sensing technique.

Upon the first interaction of the PTV remote control 107 with communication pathway 103, the communication pathway 103 will allocate a free channel to the PTV remote control 107, to initially talk to each other. Based on the PTV remote control 107 sending the video device identity to which it desires to communicate, the communication pathway 103 establishes another free link (channel) connecting the PTV remote control 107 and that particular video device. For example, the other video device may be a television system to which the PTV remote 107 desires to communicate.

For example, the sequence of operation of the video channel swapping task may be as follows: a) the viewer types the command requesting the media guide to be displayed on the PTV remote video screen 121 using his keypad; b) the processing circuitry 125 executes the command and communicates with the communication pathway 103 on a dedicated fixed BT channel; Once a BT channel is established between the PTV remote control 107 and the communication pathway 103, they can talk to each other; c) the processing circuitry 125 further interprets the commands sent by the viewer, and in the process, talks to the communication pathway 103 to setup a free channel with the device it intends to talk; d) Once the link is established, the PTV remote control 107 and the device at the other end (television system 105, in this case) start interacting by exchanging the command; and e) the PTV remote control 107 requests the media guide information, upon which the communication pathway 103 furnishes the requested media guide information.

The viewer further selects the required video channel on his PTV remote control 107 using the buttons 129, mouse 137 and/or touchpad 131. The selected video channel identifier from the PTV remote 107 control is communicated to communication pathway 103, upon which the channel is presented on the PTV remote video screen 121. The viewer will peruse the channel and issue a swap command, upon which the video channel identifier and the television system 105 identifier information is sent back to the communication pathway 103, on a Bluetooth (BT) channel.

The communication pathway 103 establishes a BT channel between itself and the television system 105 and launches the video available in the video source 101 corresponding to the video channel identifier information to the identified device (e.g., the television system 105 or associated screen 187). Similarly, if there is any control information to be exchanged between PTV remote control 107 and the television system 105, the communication pathway 103 establishes a link (both uplink and downlink) and accomplishes the interaction in terms of the exchange of the control information. The exchanged control information will be processed in the processing circuitry 191.

Figure 2:
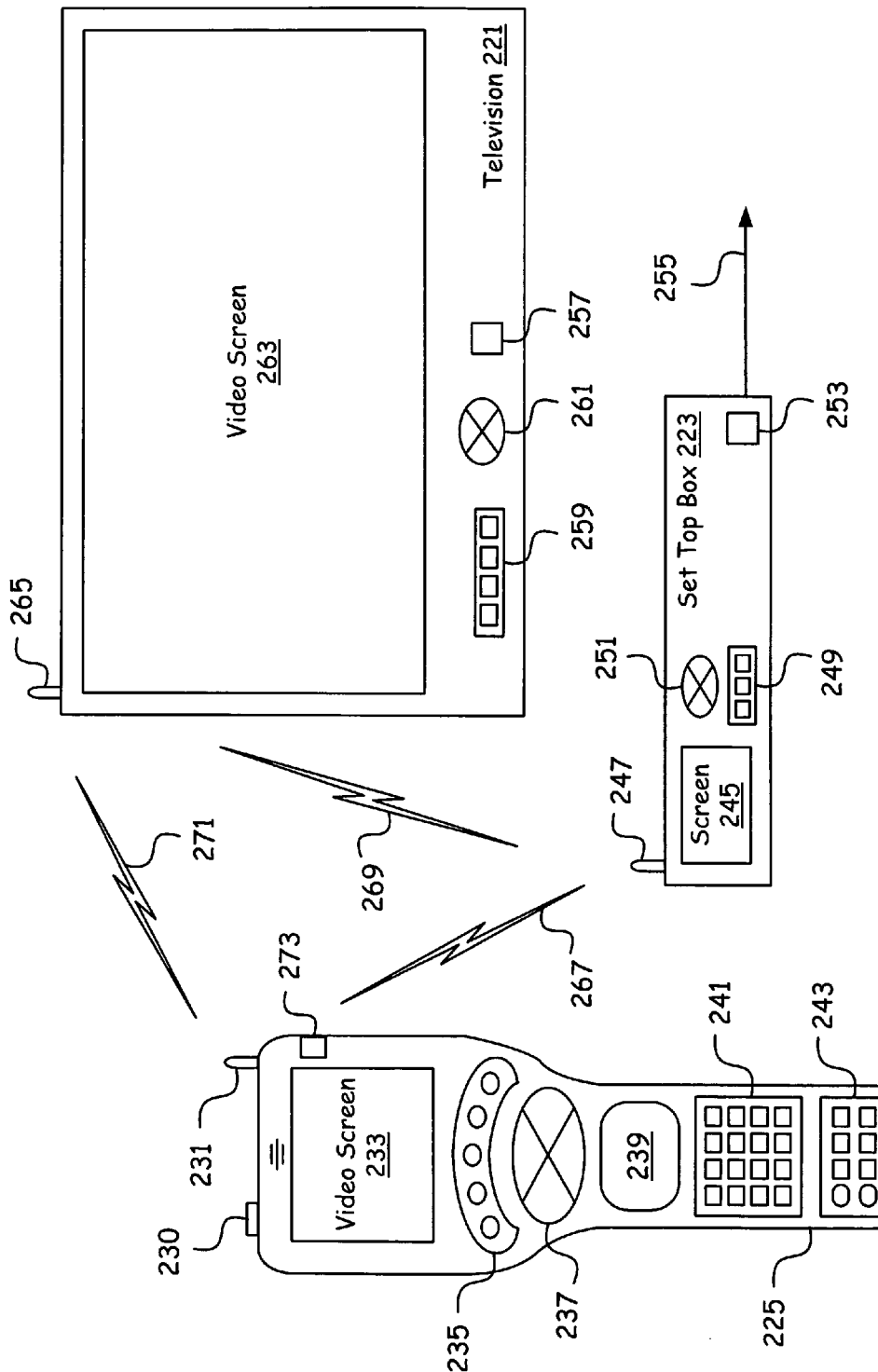
FIG. 2 is a system diagram depicting an embodiment of the television system and PTV remote control of FIG. 1, wherein the television system, i.e., a television and set top box, interacts with a remote control having a parallel TV screen.

FIG. 2 is a system diagram depicting an embodiment of the television system and PTV remote control of FIG. 1, wherein the television system, i.e., a television and set top box, interacts with a remote control having a parallel TV screen. The interaction among a television 221, PTV remote control 225 and STB (Set Top Box) 223 is shown to be wireless, although wired communication could be used. The wireless communication between these devices operates in accordance with one or more proprietary and industry standards, each being defined by a communication protocol. Using the wireless communication pathway, control signals and video with associated audio are exchanged.

The STB 223 receives media guides and associated video/audio via a link 255 from video sources, such as the video sources 101 (FIG. 1). The STB 223 has a control panel 249 for selecting the required video source, manually, and also has a video screen 245 that displays the video being displayed by either of video screens 263 and 233 or other video selected by the PTV remote control 225 or via a rocker button 251 or the control panel 249. An antenna 247 supports wireless interaction indicated as a wireless link 267 and 269.

Similarly, the television 221 includes a control panel 259 and a rocker button 261 through which direct control over the television 221 can be carried out. The television 221 also includes an antenna 265 through which control and video/audio is delivered via a wireless link 271 and the wireless link 269. Control can also be delivered via an infrared link 257.

The PTV remote control 225 has sets of buttons 235, 241 and 243 through which the viewer may control the selection and display of media guides and video selections on the video screens 233, 245 and 263. A rocker button 237 allows a viewer to browse up and down to sample or "surf" video offerings and adjust associated volume. For example, the viewer may select one of the buttons 235 to indicate that the subsequent commands will be directed to the television 221. Thereafter, the viewer may press the rocker button 237 several times, stepping through TV channel offerings on the display screen 263 until a desired channel is identified thereon. The viewer may then select another of the buttons 235 to indicate that subsequent commands will be directed to the PTV remote control 225. By requesting a media guide via one of the buttons 243, the PTV remote control 225 displays the media guide on the display screen 233. Upon receiving the viewer's selection of a video offering of the media guide from the rocker button 237, the PTV remote control 225 displays the selected video. And finally, for example, the viewer may then press one of the buttons 241 causing the video being displayed on the video screen 233 to be displayed on the video screen 263.

The PTV remote control 225 delivers control signals and receives video/audio via an antenna 231 and the wireless links 267 and 271. Also, control signals can be delivered via an infrared transceiver 230 to both or either of the television 221 and STB 223 via infrared transceivers 257 and 253, respectively.

The STB 223 may, for example, receive multiple video/audio channels from the video source 101 via communication pathway 103. The STB 223 has tuners 249, which are tuned to receive the video/audio channels. Three channels can be played simultaneously on the PTV remote's screen 233, television system screen 263 and STB screen 245.

As mentioned previously, the STB 223 and television system 221 may be controlled by the PTV remote 225 wirelessly. Also, the PTV remote control 225 may perform channel selection and tuning of the STB 223.

In an exemplary mode of operation, the three video devices 221, 223 and 225 indicated in FIG. 2 can also communicate with each other to accomplish the remote control operation using infrared signals by using the infrared transmitters/receivers (e.g., 230 on the PTV remote control 225, 253 on the STB 223, and 257 on the television system 221).

In one exemplary scenario, the STB 223 may perform video transcoding to suit its screen requirements. The PTV remote control 225 controls the reception of a plurality of TV channels available at the terminals of the communication pathway using a plurality of the channel tuners 249 available on the STB 223.

The PTV remote control 225 can sequentially access the video channels using their identifiers and peruse them and they can be saved to a memory. These channel identifier information can be retrieved by other viewers on their PTV remote device. And play them on their mini screen on a random choice. This ensures a policy by not allowing the viewers to access the complete video data repository i.e. video source 101 of FIG. 1.

In accordance with one embodiment of the present invention, the STB 223 can be part of the television 221. The input channels will come from the communication pathway 103 of FIG. 1. The STB 223 may then tune to multiple channels and launch them on to PTV remote control and television screens 233 and 263.

Figure 3A:
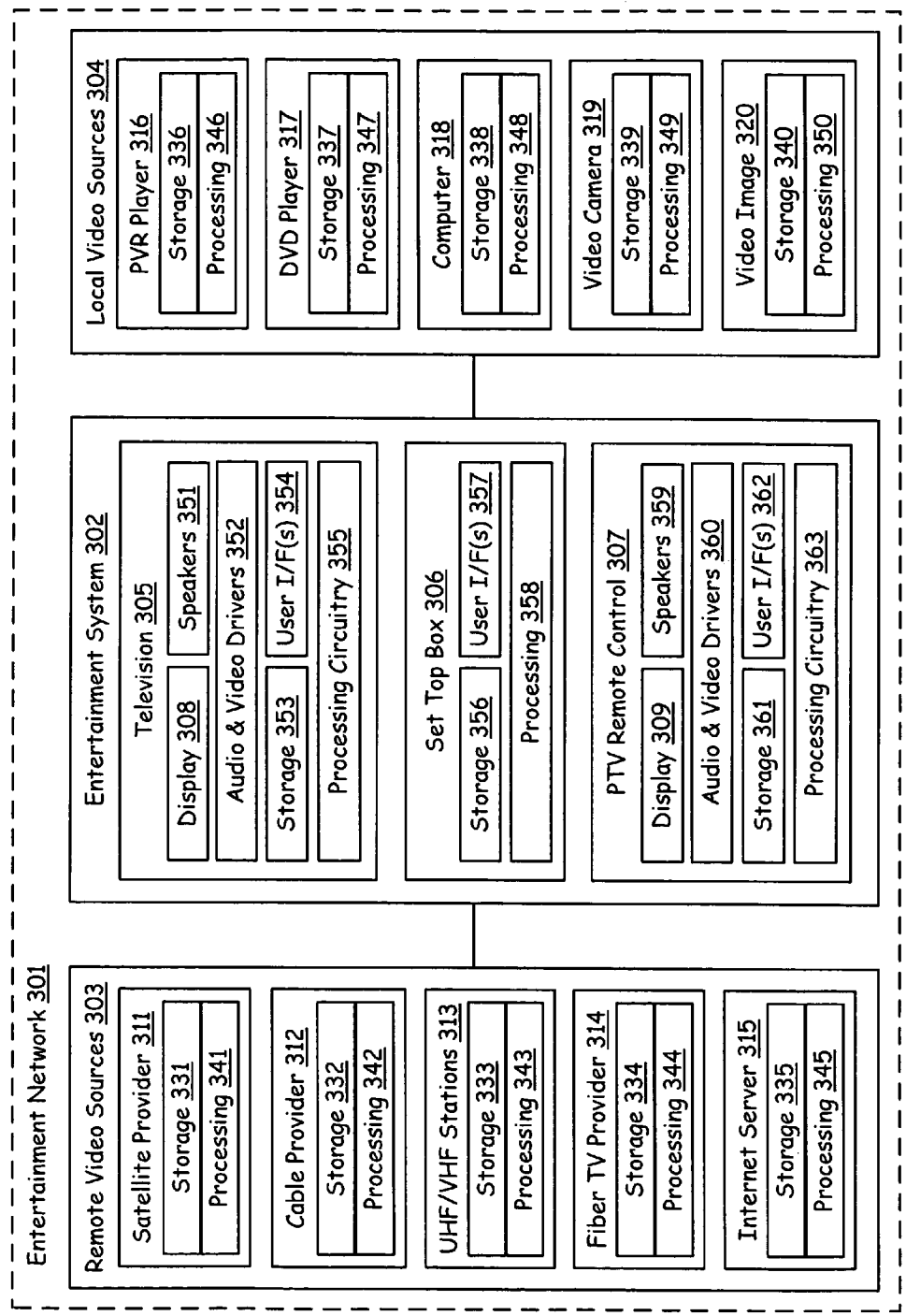
FIG. 3A is a schematic block diagram depicting various processing of video from different video sources in an entertainment network built in accordance with various aspects of the present invention.

FIG. 3A is a schematic block diagram depicting various processing of video from different video sources in an entertainment network built in accordance with various aspects of the present invention. The primary sources of video for running any entertainment network 301 based home theater are remote video and the local video sources 303 and 304. Remote video sources 303 are obtained from far off sites, obtained on a commercial basis. Remote video sources 303 include satellite provider 311, cable provider 312, VHF/UHF stations 313, fiber communication 314, and Internet servers 315.

Various types of the remote service providers 311-315 may include databases 331-335 having video files stored in them. The remote service providers 311-315 may also have respective processing circuitry 341-345 serving the request made by the home theater users (e.g., on demand ). The stored video files can be obtained and used in real time or can be stored on a recording or storage media in the home theater environment. Such stored video files can then be utilized for later playback.

The local video sources 304 are normally locally available in one form or the other and are at immediate access to its users at video source 101 database of FIG. 1 within the home theater.

The local video sources 304 comprise PVR player 316, DVD player 317, computer 318, video camera 319, and video imager 320. Each of these devices has respective storage media 336-340 and corresponding processing circuitry 346-350. Formatting/Transcoding of video/audio data is done, wherever required, to adapt for the resolution of the display unit. This operation can be done in one of the video devices, which can in turn be controlled by PTV remote control 307.

Figure 3C:
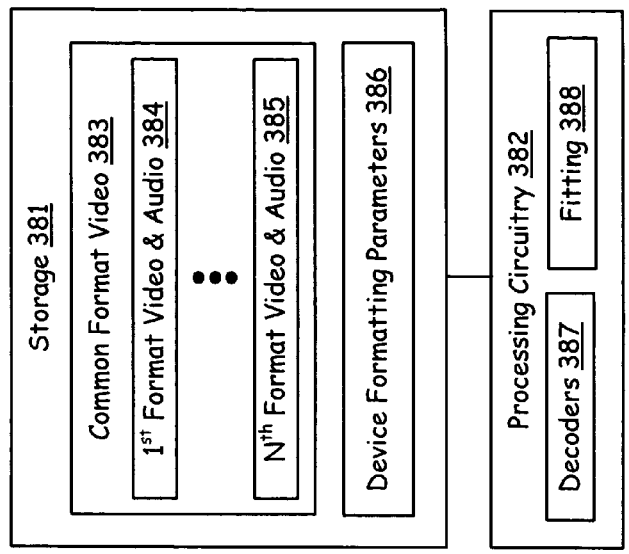
FIG. 3C is a schematic block diagram depicting exemplary structure and operation of the processing circuitry and storage associated with both the television and PTV remote control of FIG. 3A.
Figure 3B:
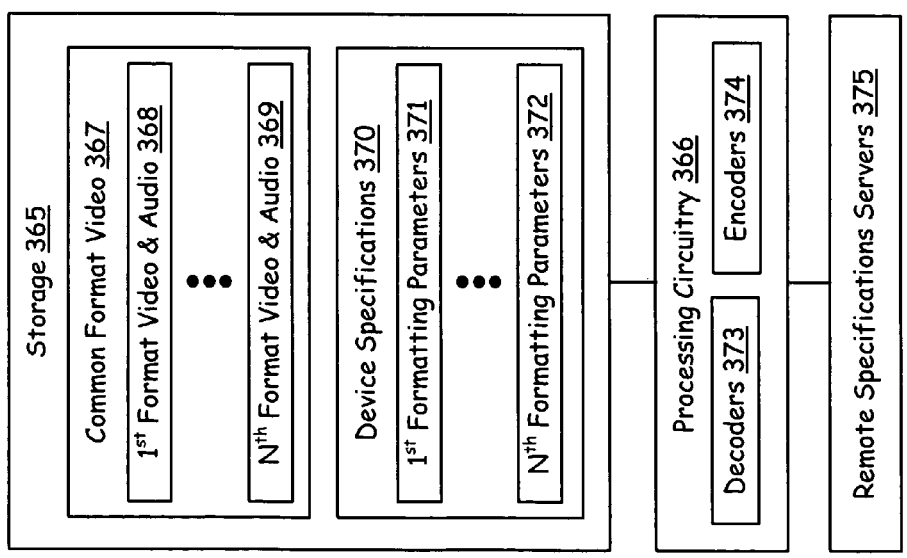
FIG. 3B is a schematic block diagram depicting exemplary structure and operation of the processing circuitry and storage within each of the video sources and the set top box of FIG. 3A.

FIG. 3B is a schematic block diagram depicting exemplary structure and operation of the processing circuitry and storage within each of the video sources and the set top box of FIG. 3A. The storage facility 365 of a video repository such as in FIG. 3A has video files stored in several formats from 1–N to cater to the needs of a large number of devices. The data repository common format video 367 has N number of video/audio format to match the device specifications 370.

The common format video 367 repository comprises first format video/audio 368 to Nth format video/audio 369. These formats are mapped as per the requirement of device specifications 370 based on the first formatting parameters 371 to Nth formatting parameters 372. Accordingly the device specifications 370 and the video format should match for a better picture to be displayed on a device screen.

Processing circuitry 366 does the function of encoding using the encoder 374 to adjust the video data to a device based on the formatting parameters. When the data enter the storage media, decoding takes place using the decoder 373. The remote specification server 375 does the necessary transcoding required for the remote screen specification.

FIG. 3C is a schematic block diagram depicting exemplary structure and operation of the processing circuitry and storage associated with both the television and PTV remote control of FIG. 3A.

The common format video 383 has video format information in its memory, from the first format video/audio 384 to the Nth format video/audio 385. Based on the device formatting parameters 386, the processing circuitry 382 does the necessary transcoding to fit the picture to the screen in fitting 388.

The incoming video/audio should have the necessary format information so that the processing circuitry 382 can process it in decoder 387 based on the device formatting parameters.

Figure 4:
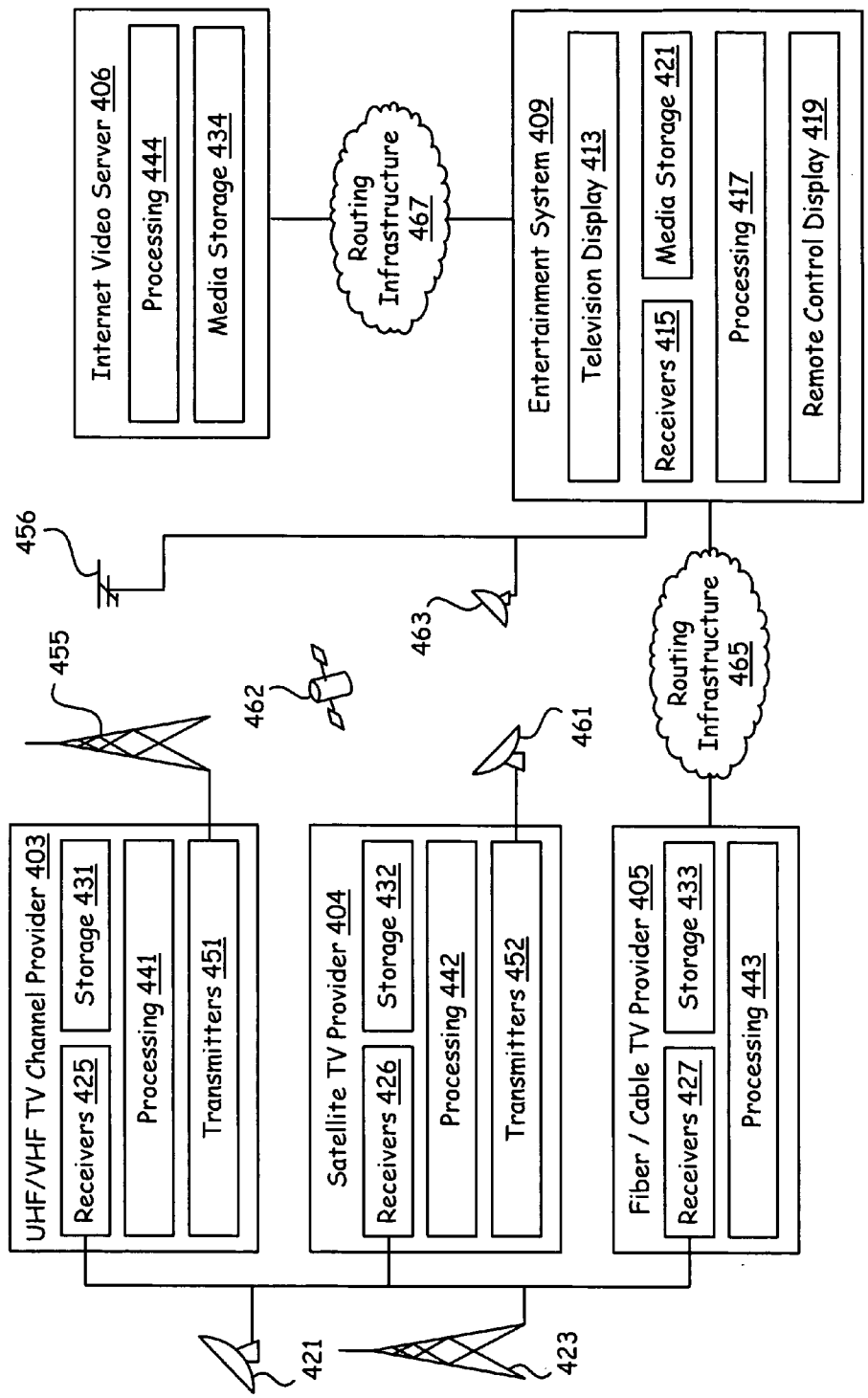
FIG. 4 is a schematic block diagram illustrating an embodiment of an entertainment network built in accordance with various aspects of the present invention, wherein various remote video sources deliver media to an entertainment system through different wired and wireless communication pathways.

FIG. 4 is a schematic block diagram illustrating an embodiment of an entertainment network built in accordance with various aspects of the present invention, wherein various remote video sources deliver media to an entertainment system through different wired and wireless communication pathways. A UHF/VHF TV channel provider 403, Satellite TV provider 404, and Fiber/Cable TV provider 405 can receive video signal/data from remote sources via a plurality of antennas 421 and 423.

Basically the video processing system of each of these service provider units have identical functionality of receiving video from one of the plurality of various remote video sources received through the antennas 421 and 423. They have receiver units 425-427, which do the receiving and amplification of the incoming video/audio.

The storage media 431-433 on each of these service provider units facilitates the storage of these received video/audio signals in a suitable format. The processing circuitry 441-443 operates on this video/audio data and does the necessary formatting suitable for the subsequent transmission through either broadcasting using antennas 455 and 461 or through a routing infrastructure 465. Internet video server 406 is one more important source of the video data, which upon downloading can be processed in a processing circuit 444 and can be stored on a storage media 434. The stored information can be routed to the destination through routing infrastructure 467.

The use of the dish antenna 461 and 463 can also facilitate the long-range communication using satellite 462 for relaying the signal to a different part of the world. If the destination of the video signal is at a relatively shorter distance, the type of the antennas 455 for transmission and 456 for reception can be employed.

The entertainment system 409 includes television display 413, receiver 415, media storage 421, and processing 417. The signal stored on a storage media may be used on the remote control display 419 and the television display 413.

Figure 5:
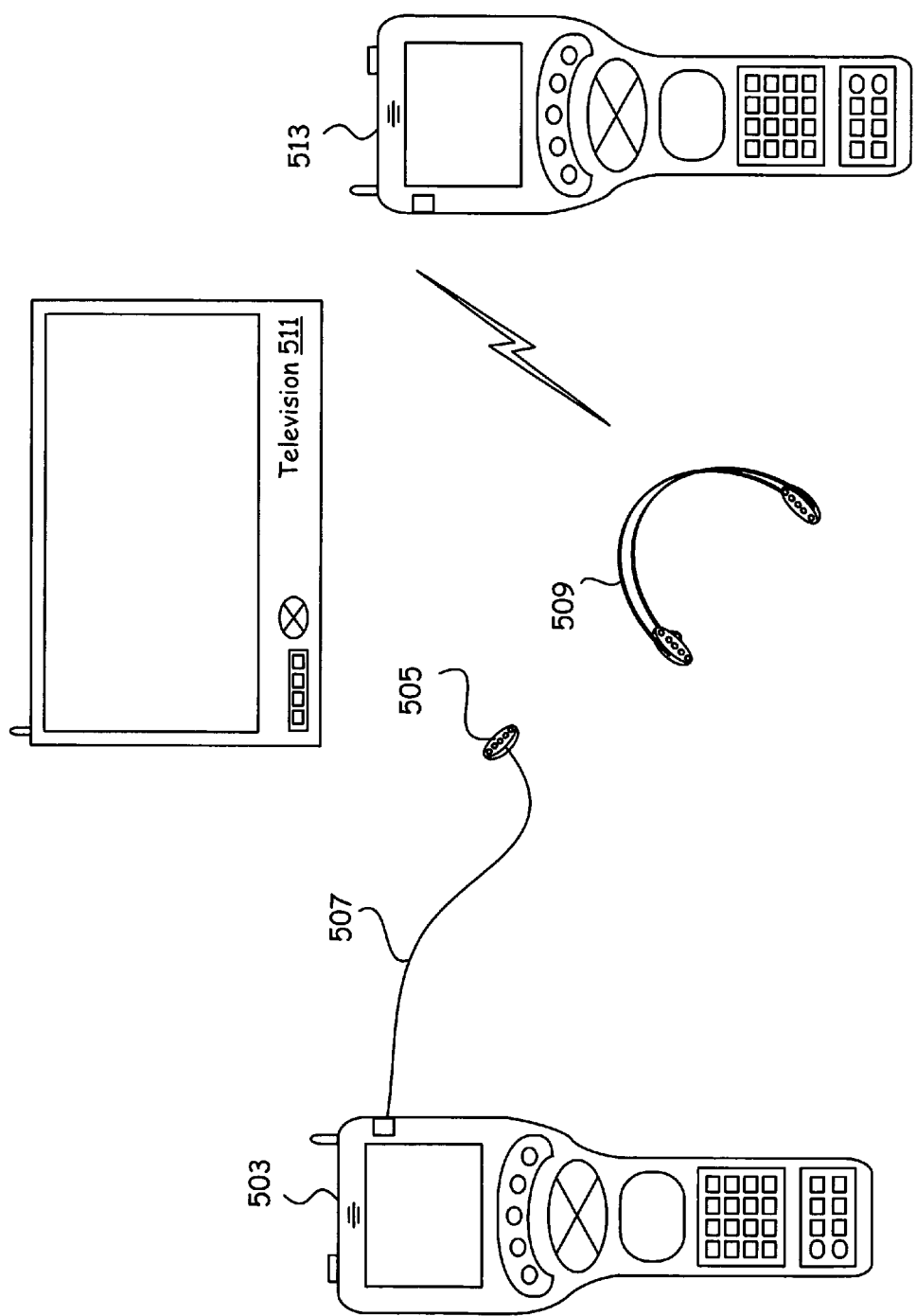
FIG. 5 is system level illustration of an exemplary entertainment system configuration with two PTV remote controls, each with audio headsets, used for simultaneous channel surfing and television control, in accordance with various aspects of the present invention.

FIG. 5 is system level illustration of an exemplary entertainment system configuration with two PTV remote controls, each with audio headsets, used for simultaneous channel surfing and television control, in accordance with various aspects of the present invention.

A PTV remote control 503 operated by a first viewer can primarily control television 511. It can also interact with a similar PTV remote control 513 that is used by another audience in an entertainment session. This hierarchy of the control helps in setting a certain level of the protocol over audiences who use the PTV remote control 503 for individual choice of video. Meanwhile users will have some amount of independence in making their own choice of video channel.

In one embodiment according to the present invention, the accompanying audio in a video channel can be received on a wireless headset 509, and in other situations, earpiece 505 can be tethered to the PTV remote control 503 through a wire 507.

Figure 6:
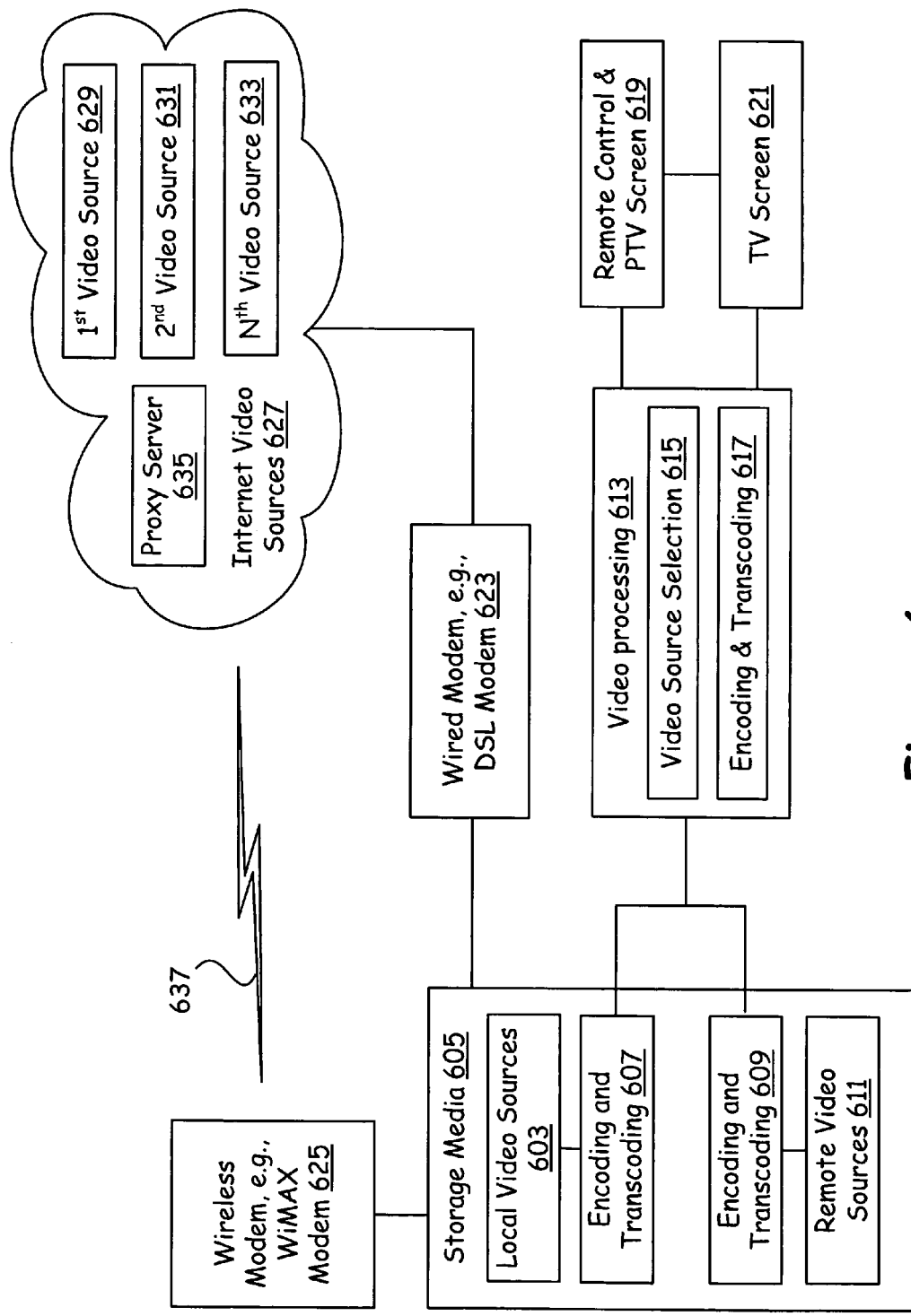
FIG. 6 is a system level block diagram illustrating an embodiment of the present invention, wherein Internet is used as a video delivery mechanism for a video source based on control signals of a PTV remote.

FIG. 6 is a system level block diagram illustrating an embodiment of the present invention, wherein Internet is used as a video delivery mechanism for a video source based on control signals of a PTV remote. Any downloaded video from the Internet can be stored locally on a storage media and can be used at later point of time.

Internet delivery of a video is a more sophisticated way of receiving video information using a wireless link 637 and a modem 625. Video can also be received on a wire and using a wired modem 623.

Internet video source 627 comprises a plurality of video servers 629-633 located at different distant locations catered to users through an Internet proxy server 635.

Storage media 605 in a home theater will have two separate parts, namely local video sources 603 and remote video sources 611. A remote video source stored on remote storage media of the remote video sources 611 comes from UHF/VHF transmission, satellite TV provider, and Internet.

Local video sources 603 are basically the video channels that may be generated locally (e.g., using a camcorder camera, local video libraries, local cable transmissions, etc.). The required video formatting may be performed using the encoding and the transcoding circuits 607 and 609 respectively from local video sources 603 and remote video sources 611.

The use of different types of video sources using a PTV remote control is accomplished using video processing circuitry 613. The video processing circuitry 613 can select a particular video source, local or remote, using video source selection 615. The required video formatting is done again in encoding and transcoding circuit 617, before receiving and presenting the formatted video on a PTV screen 619 or a TV screen 621.

Figure 7:
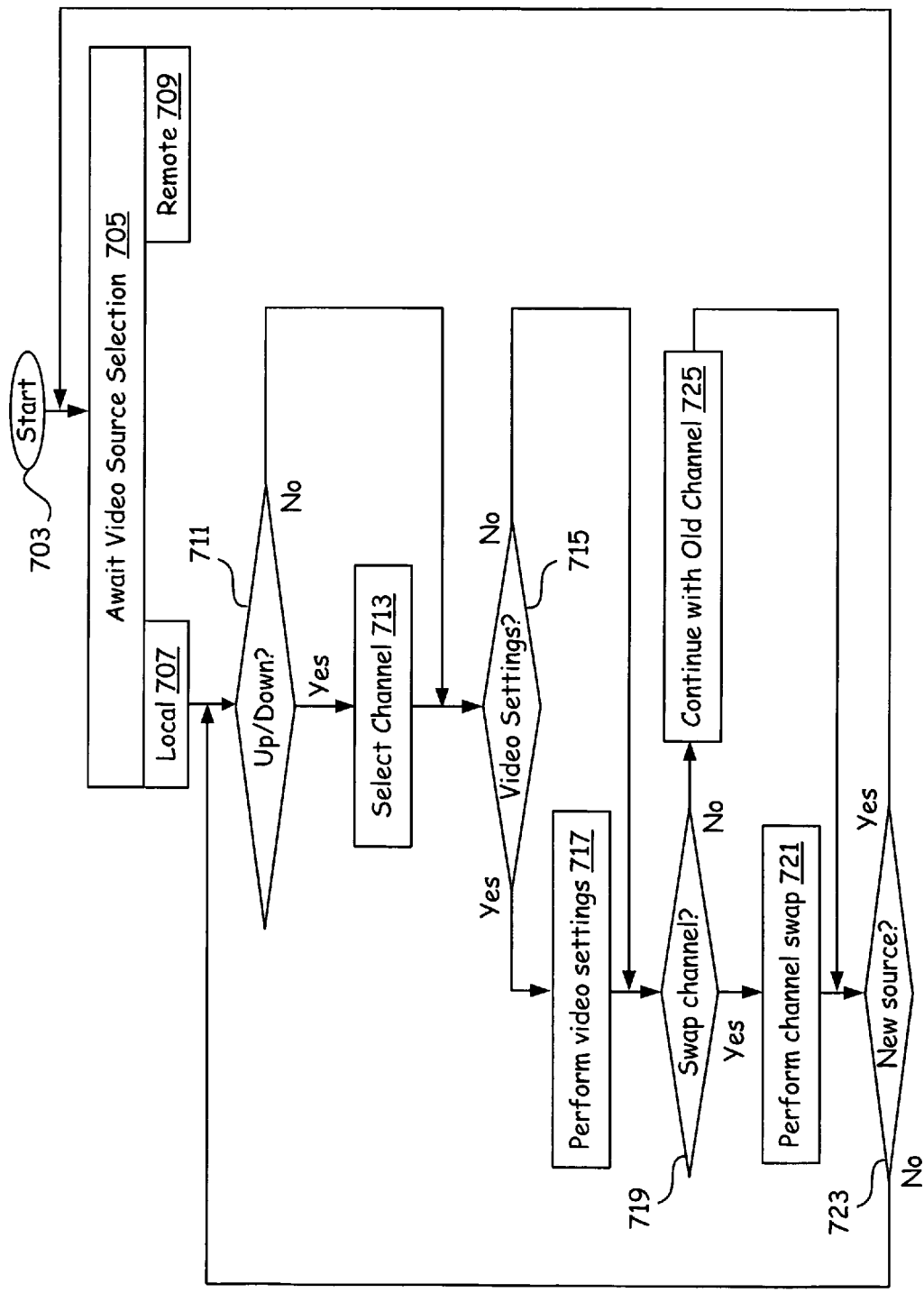
FIG. 7 is a flowchart illustrating an exemplary channel surfing operation performed by a PTV remote control, including a channel swapping operation between a television screen and a PTV remote control's screen.

FIG. 7 shows the flowchart depicting the normal operation of a PTV remote control. It portrays the operations related to video source selection, channel surfing, video settings, and channel swap operation with the television system.

When a PTV remote is switched on, it executes all the initialization programs, and gets started at 703 to perform the functions that the user selects. The PTV remote waits for video source selection at 705. When one of the video sources, either local 707 or remote 709, is selected, the PTV remote goes to next state 711, at which the PTV remote prompts the user for browsing from the channel menu. If the user scrolls up or down the channel menu and selects a channel at state 713, the selected channel will be played on the PTV screen. If no channel is selected at that instance of channel browsing, PTV remote operation proceeds.

In the next state 715, the PTV remote prompts the user for video setting information. This step includes the operations related to the fine-tuning, color setting, brightness control, etc., to optimize the picture displayed on the PTV. If the video setting is not selected, the control is simply transferred to the next step without doing anything to the picture.

Subsequently, the state of the PTV remote goes to state 719, which determines whether to perform channel swapping to change the channel on the television system. If the choice is selected to be yes, the channel on the PTV screen is swapped to the main screen at state 721, otherwise the old channel is continued at state 725.

In the next state 723, the PTV remote prompts its user for a new video source. If the user selects a new video source, the control again goes back to state 705, otherwise to state 711.

Figure 8:
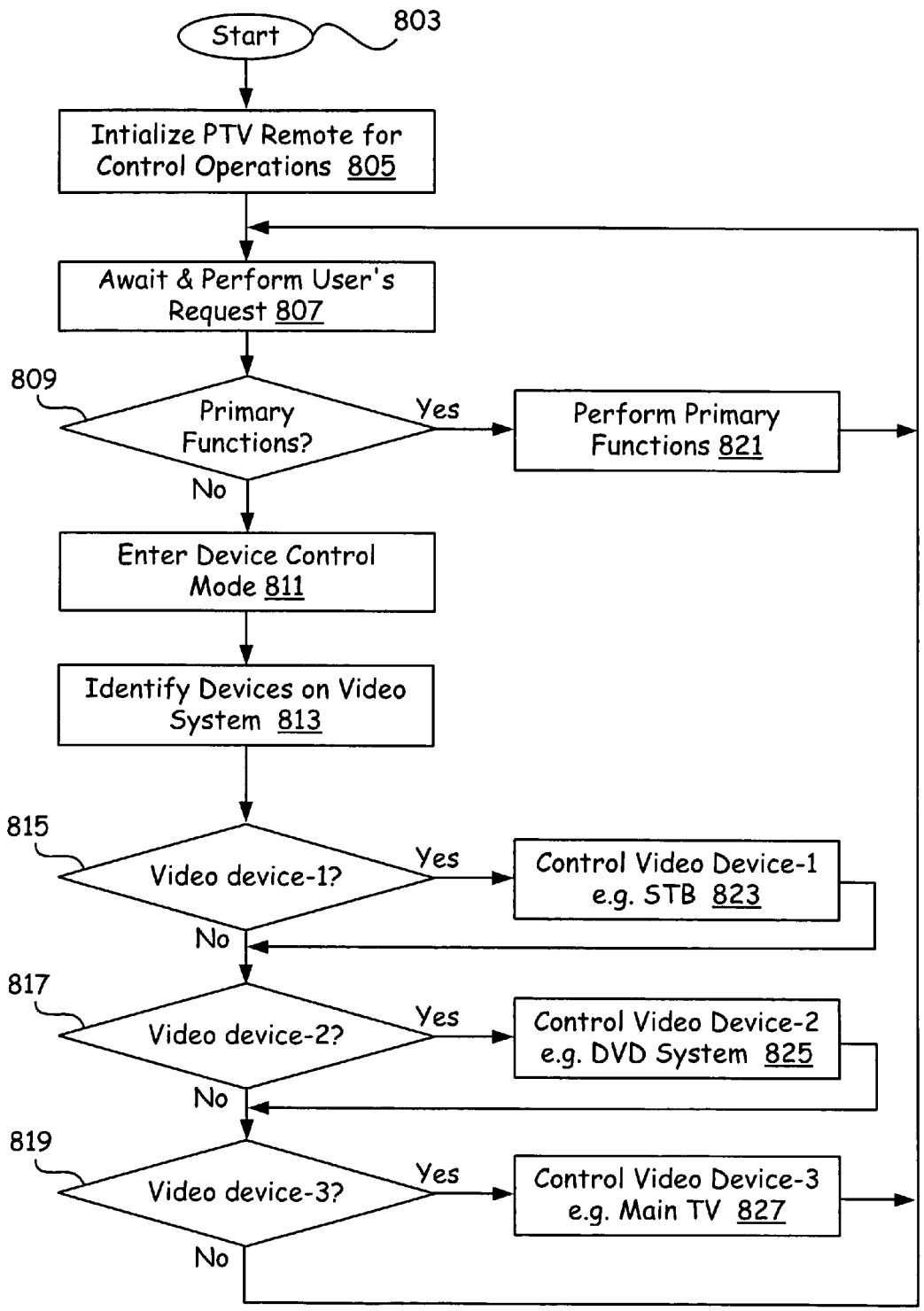
FIG. 8 is an exemplary flowchart depicting a control operation invoked by a PTV remote control in response to viewer input received via a user interface such as a keypad in accordance with various aspects of the present invention.

FIG. 8 is an exemplary flowchart depicting a control operation invoked by a PTV remote control in response to viewer input received via a user interface such as a keypad. Some of the user's requests include functionalities such as audio control, voice recognition, etc., on the PTV remote control itself. Video device control involves the PTV remote's control of a STB, television system, DVD player, etc.

In an embodiment according to the present invention, on powering up, the PTV remote starts at state 803, following which the PTV remote enters a state to initialize the PTV remote to device control operation at state 805, through a mode selection key. Subsequently, the PTV remote enters a state where it serves the user's request at state 807. The user's request involves video/audio controls, games, etc., utilities on the PTV remote control.

After performing the user's request at state 807, the PTV remote enters a state where it tests for any request for primary functions required in the decision box 809. If required, the PTV remote performs according to the choice made by its operator, as explained in FIG. 7; otherwise it goes to state 811 entering the device control mode.

In an embodiment according to various aspects of the present invention, the PTV remote checks whether there are any video devices being configured on it for their control. If there are, the PTV remote identifies those devices for the control operation, in state 813.

In one embodiment according to various aspects of the present invention, the PTV remote enters state 815, where it checks whether a PTV remote's user wants the control of a device mapped on video device-1. For example, for a STB being mapped on the device name video device-1, any control operation required as requested by the user will be performed at state 823. If there is no request made to control the video device-1, control passes on to decision box 817, where the PTV remote checks whether a device (e.g., DVD system) mapped on video device-2 is requested to be controlled by the PTV remote. If yes, the PTV remote goes to state 825 and performs the control operation of the DVD system. If there is no request made to control Video Device-2, control passes on to state 819, checking whether there is any request made to control a device mapped on video device-3 (e.g., a television system). If the test is successful, the PTV remote performs the control operation of the television system; otherwise it goes back to state 807 and the sequence repeats.

Figure 9:
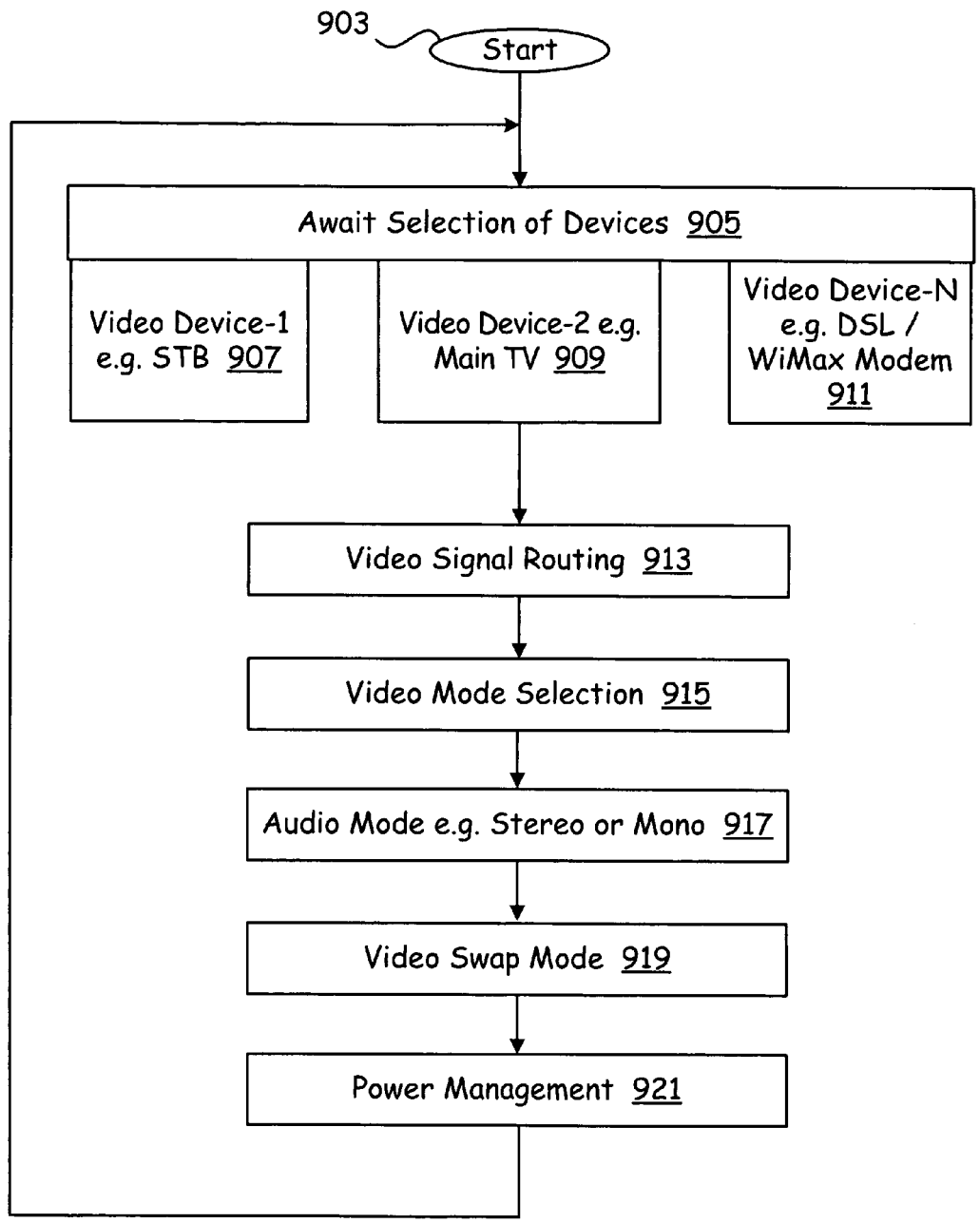
FIG. 9 is a flowchart depicting several exemplary control operations such as channel surfing, perusing and swapping in an entertainment system having a television system and a PTV remote control in accordance with various aspects of the present invention.

FIG. 9 is a flowchart depicting an exemplary control operation of a video device such as a television system, including channel surfing, perusing and swapping in a home TV entertainment system. Each of the devices from video device-1 to video device-N requires the control of different sets of parameters in different ways. For example, in a STB, the parameters that need to be controlled may include source selection (local or remote), channel selection and adjustment, sorting and mapping of the channels, etc. Likewise, if we take a video device such as a WiMAX or a DSL modem, it is the network configuration related PTV remote control operations that are required. Similarly, controlling of the television system can be performed as exemplified in this flowchart.

In an embodiment according to the present invention, upon starting a PTV remote control at state 903, and subsequently selecting the device control mode upon user's request, the PTV remote enters a waiting state 905 wherein a device can be selected from the device list for its control operation. Video devices may be mapped on an internal generic format like video device-1, video device-2, . . . video device-N. In this flowchart, television system 909 is mapped to a device video device-2, as indicated in detail in this Figure. Examples of other video devices, in typical application are the STB 907 mapped in this Figure to device name video device-1, and DSL and WiMAX modem 911 mapped as Nth video device in the device list of the PTV remote.

In an embodiment according to various aspects of the present invention, upon launching a channel on the PTV remote screen and perusing the channel contents, the input video signal corresponding to that channel can be relayed to the television system either directly from the communication pathway (Comm. Pathway of FIG. 1) or via the PTV remote control. The latter option makes the channel to be continuously monitored and perused. This choice of video sourcing can be controlled or programmed on the PTV remote control, as in state 913, for video signal routing.

In an embodiment according to various aspects of the present invention, the video mode of the television system can be set to color or block and white, as in state 915, according to a video mode selection option. This is preferable when running black and white video signals from old black and white video recordings. The problem of color flicker in black and white programs can thus be avoided, improving the video quality.

In one embodiment according to various aspects of the present invention, the audio mode of the television system can be set to either stereo or mono mode in state 917 using the PTV remote control, depending on the audio signal quality. For example, listening in a mono mode by changing the mode is better when the stereo signal level is low and noisy.

In an embodiment according to the present invention, swapping of the channel may be performed after the perusal of the channel contents. Such perusal can either be performed using picture-in-picture (PIP) or using the whole display. This option can again be controlled using the PTV remote control, as in state 919, in video swap mode.

In an embodiment according to the present invention, the power management options can be set or controlled remotely in state 921, to select the power management options. This feature is important where the power and hence battery life is the main concern, in certain applications.

The term "communicatively coupled", as may be used herein, includes wireless and wired, direct coupling and indirect coupling via one or more other component(s), element(s), circuit(s), or module(s). Inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

The functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A remote control device that controls display of a plurality of video programming on a first screen of a television system, the remote control device comprising:
   a housing;
   a communication interface;
   a second screen disposed on the housing;
   a user input interface operable to receive a first selection and a second selection; and
   at least one module operable to, at least:
      display a first media guide corresponding to a first media source on the second screen, the first media guide comprising a plurality of video titles;
      in response to at least the first selection, communicate a first control signal via the communication interface to cause the first media source to deliver a first video of the plurality of video titles to the first screen, the first video having a first resolution configured for the first screen;
      in response to at least the second selection, communicate a second control signal via the communication interface to cause a second media source to deliver a second video to the remote control device, the second video having a second resolution configured for the second screen; and
      establish a new wireless communication link between the remote control device and the television system through the communication interface in response to a swap command, and exchange, across the new wireless communication link, current offsets associated with each of the first video and the second video.

2. The remote control device of claim 1, wherein the first video and the second video comprise different video content.

3. The remote control device of claim 1, wherein the at least one module is further operable to request a second media guide from the second media source, and display the second media guide on the second screen.

4. The remote control device of claim 3, wherein the second media source is accessed via the communication interface which is further in communication with the internet.

5. The remote control device of claim 3, wherein the second media source comprises an internet based media server.

6. The remote control device of claim 5, wherein the internet media server is operable to selectively deliver the second video in response to the second selection being selected from the second media guide.

7. The remote control device of claim 1, further comprising audio circuitry.

8. The remote control device of claim 1, wherein the communication interface comprises a wireless audio headset interface operable to communicate audio corresponding to the first video to a wireless headset.

9. A remote control infrastructure, the remote control infrastructure comprising:
   at least one communication pathway;
   a local media source and a remote media source communicatively coupled to a first screen via the at least one communication pathway; and
   a remote control comprising a user interface and a second screen, the remote control being communicatively coupled to the local media source and the remote media source via the at least one communication pathway, wherein the remote control is operable to:
      request a first media guide corresponding to a first plurality of media programs from the local media source;
      request a second media guide corresponding to a second plurality of media programs from the remote media source;
      accept a first user input via the user interface corresponding to selection of a first media program from the first plurality of media programs of the first media guide;
      respond to receipt of the first user input by causing the first screen to display the first media program;
      accept a second user input via the user interface corresponding to selection of a second media program from the second plurality of media programs of the second media guide;
      respond to receipt of the second user input by causing the second screen to display the second media program;
      accept a third user input via the user interface; and
      respond to receipt of the third user input by causing the first screen and the second screen to swap the respective media programs, the swap comprising:
         transmission of video identifiers of the first media program displayed on the first screen to the second screen, and
         transmission of video identifiers of the second media program displayed on the second screen to the first screen.

10. The remote control infrastructure of claim 9, wherein the remote media source comprises an internet media server.

11. The remote control infrastructure of claim 9, wherein the remote control is further operable to respond to the receipt of the third user input by downloading the second media program to a storage media.

12. The remote control device of claim 1, wherein the new wireless communication link is a bluetooth channel dedicated to communication between the at least one module and a video device operable to swap video in response to the swap command.

13. The remote control device of claim 12, wherein the at least one module is operable to exchange a video device identifier and request media guide information through the bluetooth channel from the video device.

14. The remote control device of claim 12, wherein the at least one module is operable to send a video channel identifier through the new wireless communication link to the video device.

15. The remote control device of claim 1, wherein the new wireless communication link includes a new bluetooth channel.

16. The remote control device of claim 1, wherein the new wireless communication link includes both, an uplink and a downlink.

17. The remote control infrastructure of claim 9, wherein the video identifiers comprise a video source identifier, a video selection identifier, and a current offset into a current media program.

18. A remote control device that controls display of a plurality of video programming on a first screen of a television system, the remote control device comprising:
   a housing;
   a communication interface;
   a second screen disposed on the housing;
   a user input interface operable to receive a first selection and a second selection; and
   at least one module operable to, at least:
      display a first media guide corresponding to a first media source on the second screen, the first media guide comprising a plurality of video titles;
      in response to at least the first selection, communicate a first control signal via the communication interface to cause the first media source to deliver a first video of the plurality of video titles to the first screen, the first video having a first resolution configured for the first screen;
      in response to at least the second selection, communicate a second control signal via the communication interface to cause a second media source to deliver a second video to the remote control device, the second video having a second resolution configured for the second screen;
      establish a new wireless communication link between the remote control device and the television system through the communication interface in response to a swap command, and exchange, across the new wireless communication link, current offsets associated with each of the first video and the second video; and
      respond to the swap command received via the user input interface by causing the first video to be displayed on the second screen and the second video to be displayed on the first screen.

19. The remote control device of claim 18, wherein the new wireless communication link includes both, an uplink and a downlink.

* * * * *